Oct. 24, 1950     C. R. MIESS     2,527,102
TIRE REMOVING TOOL
Filed Sept. 30, 1947     3 Sheets-Sheet 1
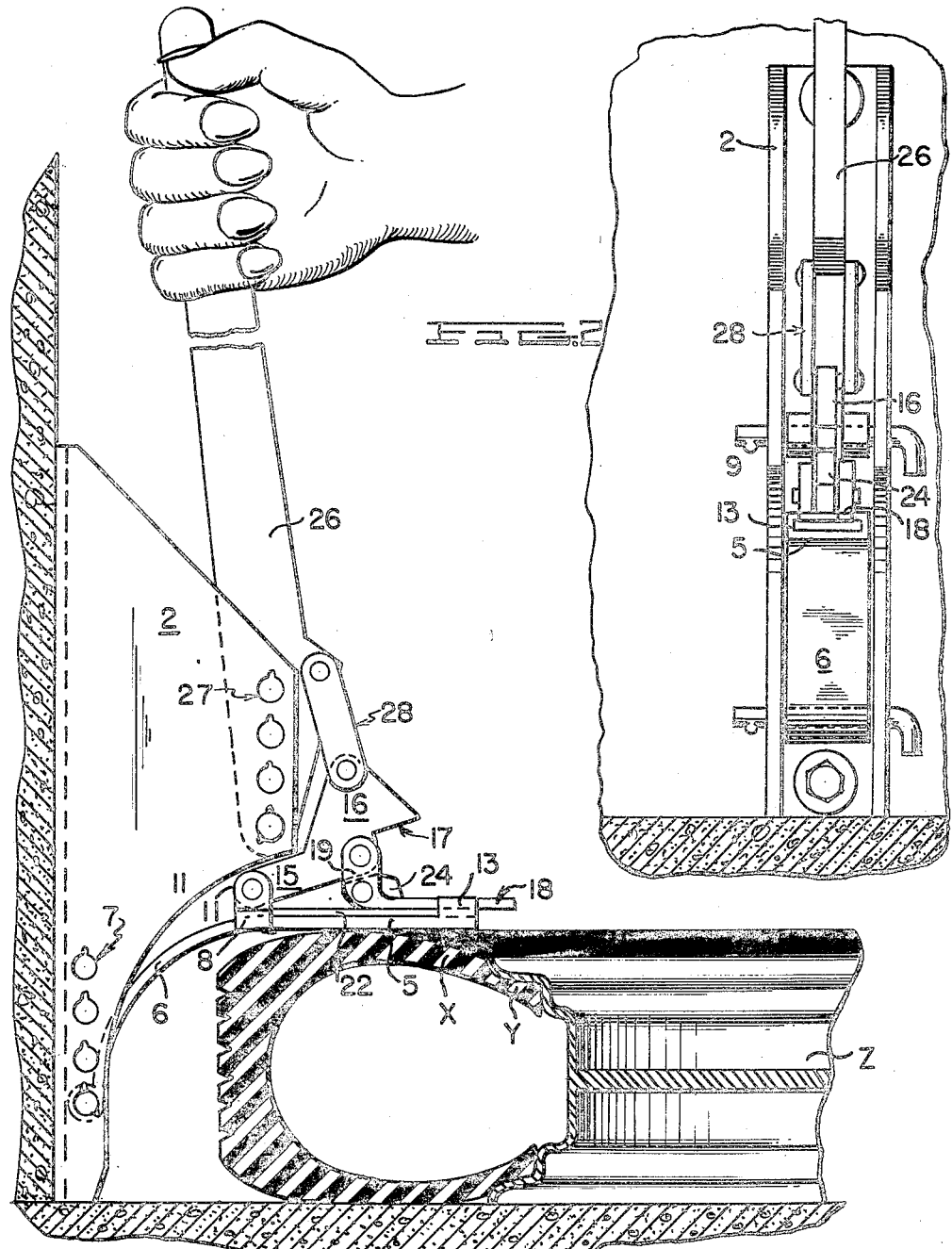
*INVENTOR.*
Charles R. Miess
BY *Robert U. Geib, Jr.*
Attorney

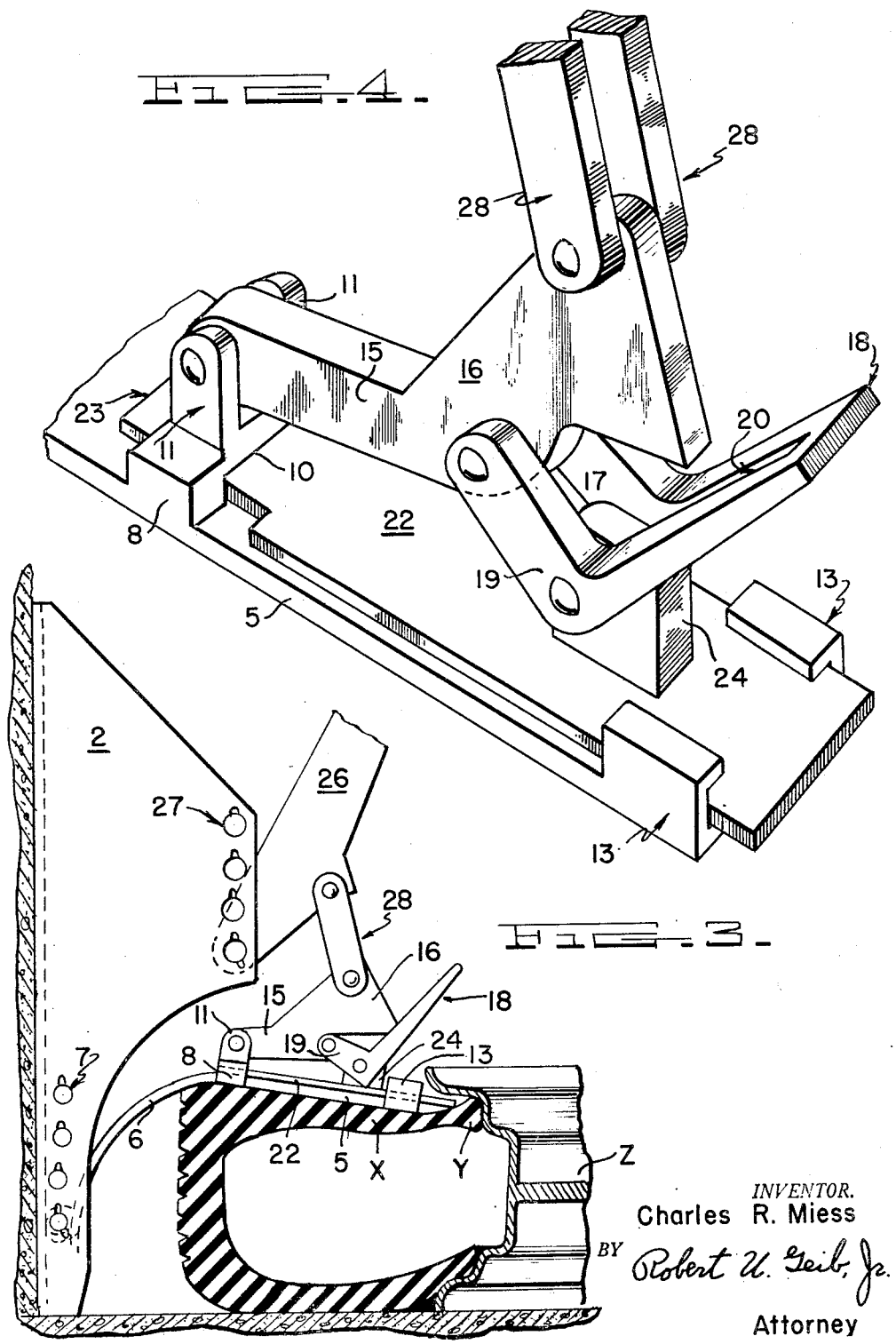

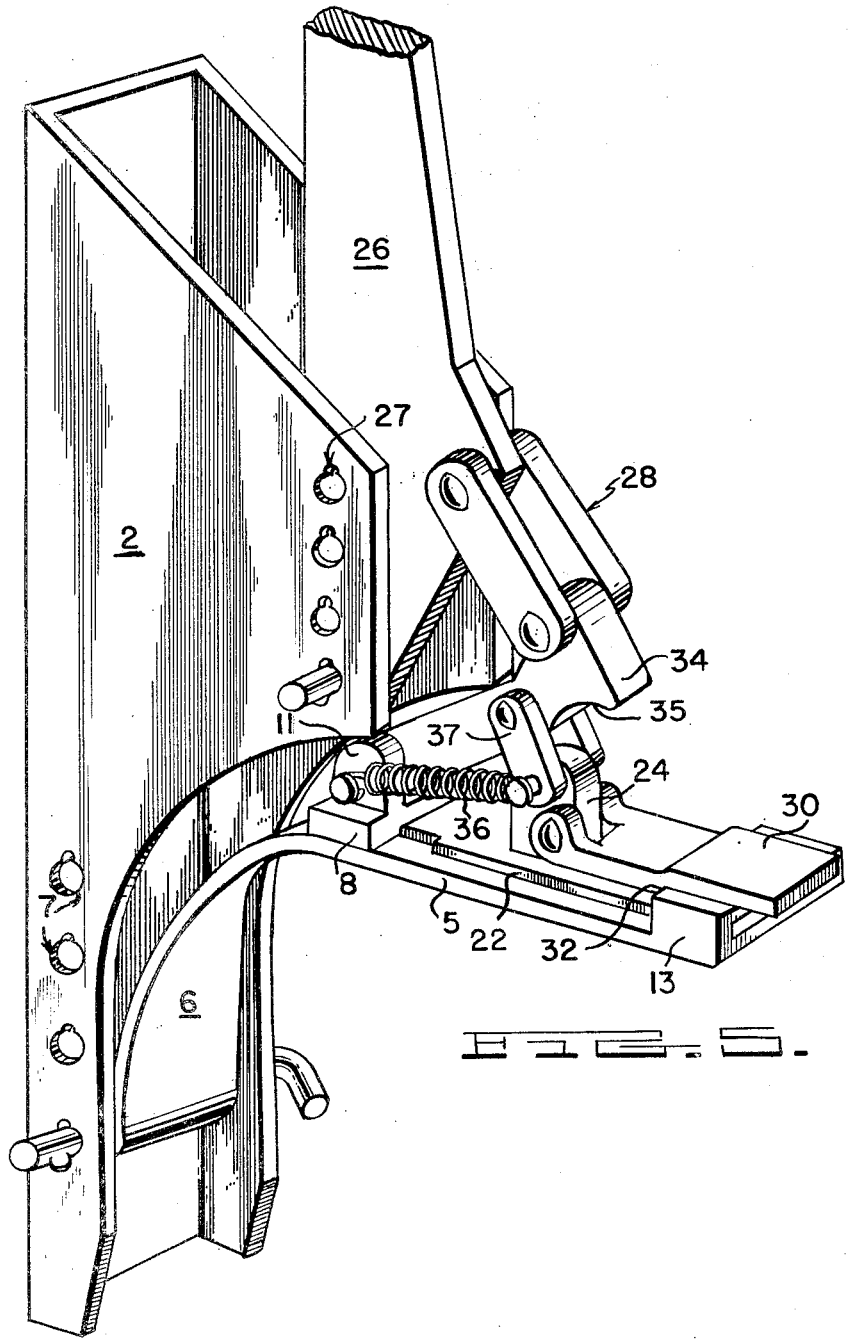

Patented Oct. 24, 1950

2,527,102

UNITED STATES PATENT OFFICE 2,527,102

TIRE REMOVING TOOL

Charles R. Miess, Oak Lawn, Ill.

Application September 30, 1947, Serial No. 776,887

8 Claims. (Cl. 157—1.17)

This invention relates to lever-actuated axially shifting type tire bead loosener for efficiently assisting in the removal of tire casings from wheel rims.

In the past, numerous attempts have been made to provide a satisfactory means for facilitating the removal of vehicle tires from wheel rims for tire repairs, etc., but so far as I am aware all of the devices of the prior art have been characterized by one or more undesirable features. One fundamental difficulty I have observed is that most of the prior art devices so operate as to either force a wedge between the bead of the tire and the rim of the wheel, or exert sufficient pressure on the casing itself to tear it and the bead loose from the wheel rim. In either case there is considerable danger of injuring the tire casing.

It is among the objects of the present invention to provide a lever-actuated axially shifting type tire bead loosener for assisting in the removal of a tire casing from a wheel rim without any possibility of imparting injury to the casing.

Another object is the provision of a tool of the class described which is quick and easy to operate.

Still another object is the attainment of the foregoing objectives in a tool which is easy and inexpensive to manufacture, and one which is very durable in service.

Further objects of the invention will appear from the following description taken in connection with the drawings which form a part of this specification, and in which:

Figure 1 is a side elevation of a preferred form of the novel tire changing tool, the same being shown as secured to a suitable vertical support, such as the wall of a building, a post, etc., and in comparatively close adjacency to the floor or ground;

Figure 2 is a fragmentary end elevation of the showing of Figure 1;

Figure 3 is a view similar to that of Figure 1, but showing certain of the elements of the device in another stage of operation;

Figure 4 is a fragmentary enlarged perspective; and

Figure 5 is perspective of a permissive modification.

Referring more particularly to the drawings the numeral 2 generally designates a bracket which carries the operating elements of the tire removing tool of the invention. This bracket 2 comprises a pair of parallel side plates or flanges which are connected together by a back member or web as shown, the latter being adapted to be secured to any convenient vertical supporting means such as the wall of a building, a post, etc. at a position which is adjacent the floor or ground, and with the said web extending vertically. The upper and lower ends of the side plates or flanges of the bracket 2 are relieved as shown, the purpose of which will later become more apparent.

The operating elements of the device of the present invention comprise a substantially flat pressure plate 5 the inner end of which is downwardly curved as shown at 6. Through a suitable pin, the inner extremity of the curved end 6 of the pressure plate 5 is adapted for attachment between the lower (and relieved) ends of the side plates or flanges of the bracket 2, a series of holes 7 being provided for obtaining a variety of adjustment in a vertical direction.

Mounted atop the pressure plate 5 at a point where the latter merges into its downwardly curved extension is a transversely extending block 8 the bottom of which is provided with a rectangular recess 10 immediately above the upper surface of the said pressure plate. In addition, the block 8 is provided with a pair of superposed, spaced parallel ears 11, the purpose of which will be later described.

The outer end of the pressure plate 5 is provided with a pair of opposed lugs 13 the tops of which are right-angularly extended toward each other as shown.

Extending between and pivotally connected to the ears 11 atop the block 8 is a short lever 15, the outer end of which extends toward the lugs 13 and is provided with an overhanging triangularly shaped portion 16. This construction provides a recess 17 at the outer extremity of the short lever 15.

An L-shaped or bell crank lever 18 having a bifurcated end 19 and a communicating longitudinal slot 20 is pivotally connected to the outer end of the short lever 15 with the outer ends of the bifurcations (19) in the embracing relationship shown.

A substantially rectangular slidable plate 22 is mounted atop the pressure plate 5 with its side edges embraced by the lugs 13 on the outer end of the pressure plate. The inner end of the slidable plate 22 is provided with a tongue 23 which extends through and rides in the rectangular recess 10 in the bottom of the block 8.

Mounted atop the slidable plate 22 is a single ear 24 which is adapted to extend between the bifurcations 19 of the L-shaped lever 18 and also into the longitudinal slot 20 which communicates therewith. A suitable pin pivotally connects the ear 24 and the bifurcated end 19 of the L-shaped lever 18.

Disposed above the short lever 15 is a hand-operated lever 26 which is adapted for pivotal attachment between the side plates or flanges of the bracket 2, a series of holes 27 being provided (as in the case of the holes 7) for obtaining a variety of adjustment, thereby accommodating tire casing of widely varying sizes, as will be more readily understood as this description proceeds. A pair of short links 28 pivotally connect the lower (and pivotally mounted) end of the hand-operated lever 26 with the overhanging triangularly shaped portion 18 on the outer end of the short lever 15.

In operation:

The tire casing X, and the rim Z on which it is mounted, are placed on the floor immediately below the bracket 2, and the pressure plate 5 and the hand-operated lever 26 are suitably adjusted on the said bracket to readily accommodate the size of tire involved. Next, the hand-operated lever 26 is moved downwardly away from the bracket and toward the tire, thus causing the substantially flat pressure plate 5 to assume a substantially horizontal position over the side-wall of the tire. Continued downward movement of the hand-operated lever 26 will cause the pressure plate 5 to flatly contact the side-wall of the tire and compress the same toward the major plane thereof. As the pressure plate 5 moves downwardly in contact with the side-wall the outer end of the L-shaped lever 18, which overhangs the outer end of the pressure plate 5, contacts the outer edge of the rim Z and the further downward movement of the pressure plate causes the L-shaped lever 18 to move into an upward position with respect to the pressure plate, thus causing the downward movement of the bifurcations 19 of the said L-shaped lever. This results in the outward movement of the outer end of the sliding plate 22 to such a position that it overlies the outer end of the pressure plate and moves under the rim Z. From this time on the continued downward movement of the hand-operated lever 26 causes the downward movement of the pressure plate 5 and the sliding plate 22 in unison, whereby both the side-wall X and the bead Y of the tire are simultaneously engaged and compressed without injury to either.

Referring to Figure 5 of the drawings, a modified form of the invention contemplates a "trigger" in lieu of the L-shaped lever 18 and its associated instrumentalities. According to this modification there is provided on the forward end of the single ear 24, on the slidable plate 22, a transversely extending pin which occupies a position immediately above the upper surface of the slidable plate. This pin carries a pivotally mounted trigger 30 which is adapted to overlie the outer end of the slidable plate 22 and project therefrom sufficiently to engage the outer edge of the wheel rim. The underside of the trigger 30 is provided with a vertical abutment 32 which is adapted to contact the inner vertical faces of the lugs 13 when the trigger is in its downward position. In addition, a substantially rectangular lever 34 is substituted for the short lever 15 of the embodiment earlier described, the underside of the outer end of the said rectangular lever being relieved as shown at 35. A pair of springs 36 influence the slidable plate 22 into its extreme rearward position. Links 37 pivotally connect the mid-portion of the lever 34 with the ear 24 on the slidable plate 22. These links are arranged with respect to the path of motion of the lever 34 in such a way that downward movement of the hand-operated lever 26 tends to shift the slidable plate 22 into projecting position with respect to the member 5.

The operation of the modification of Figure 5 is as follows:

The tire casing X and the wheel rim Z are positioned with respect to the apparatus and the lever 26 is moved downward to cause the pressure plate 5 to compress the tire in the manner earlier described. As the pressure plate 5 moves downwardly in contact with the side-wall, the outer end of the trigger 30 which overhangs the outer end of the pressure plate 5 contacts the outer edge of the rim Z, and the further downward movement of the pressure plate causes the trigger 30 to move upwardly and break contact between the vertical abutment 32 and the inner vertical faces of the lugs 13, and thereby releasing the slidable plate 22 so as to allow it to be shifted into projecting position with respect to the pressure plate 5 upon continued downward movement of the operating lever 26. Thus the outer projecting end of the slidable plate 22 is shifted to such a position that it overlies the outer end of the pressure plate and moves under the rim Z. From this time on, the continued downward movement of the hand operated lever 26 causes the downward movement of the pressure plate 5 and the slidable plate 22 in unison, whereby both the side-wall X and the bead Y of the tire are simultaneously engaged and compressed without injury to either.

In the case of either the embodiment illustrated in Figures 1 through 4, or the modification of Figure 5, the slidable plate 22 may serve to loosen the bead of the tire should it tend to adhere to the rim. This is accomplished by the wedging action of the outer end of the slidable plate between the bead and the rim as the substantially flat pressure plate 5 compresses the side-wall of the tire.

Although this invention has been described in connection with certain specific embodiments, the principles involved are susceptible of numerous other applications that will readily occur to those skilled in the art. The invention is, therefore, to be limited only as indicated by the scope of the appended claims.

I claim:

1. A tire bead loosener for assisting in the removal of a tire casing from a wheel rim comprising a pressure element, operating means for moving said pressure element into and out of contact with the side-wall of an adjacently disposed tire casing, a second pressure element carried by said first-named pressure element for bodily shiftable movement with respect thereto, said second pressure element being normally held in a retracted position with respect to said first-named pressure element and out of contact with the tire casing, and means cooperating with said operating means for moving said second pressure element into projecting position with respect to said first-named pressure element and into contact with the tire casing, whereby said first-named pressure element collapses the side-wall of the tire casing and the projecting end of said second-named pressure element moves between the rim of the wheel and the adjacent bead of the tire and both of said pressure elements thereafter are rendered capable of conjoint movement to simultaneously continue the collapse of both the aforementioned side-wall and bead.

2. A tire bead loosener for assisting in the removal of a tire casing from a wheel rim comprising a pressure element, a second pressure element carried by said first-named pressure element for bodily shiftable movement with respect thereto, operating means for moving said first-named pressure element into and out of contact with the side-wall of an adjacently disposed tire casing and for shifting said second pressure element, and means for maintaining said second-named pressure element in retracted position during the early movement of said operating means, said last-named means being actuated upon continued movement of said operating means to release said second pressure element and allow said operating means to move said second-named pressure element into projecting position with respect to said first-named pressure element, whereby said first-named pressure element collapses the side-wall of the tire casing and the projecting end of said second-named pressure element moves between the rim of the wheel and the adjacent bead of the tire and both of said pressure elements thereafter are rendered capable of conjoint movement to simultaneously continue the collapse of both the aforementioned side-wall and bead.

3. A tire bead loosener for assisting in the removal of a tire casing from a wheel rim comprising a pressure element, operating means for moving said pressure element into and out of contact with the side-wall of an adjacently disposed tire casing, a second pressure element carried by said first-named pressure element for bodily shiftable movement with respect thereto, said second-named pressure element being operatively connected to said operating means, and displaceable means adapted to overlie and project from the outer end of said second pressure element and thereby make contact with the rim of the wheel, said displaceable means being operable to retain said second-named pressure element in retracted position during the early movement of said operating means and upon contact with the rim of the wheel to release said second pressure element and allow said operating means to move said second-named pressure element into projecting position with respect to said first-named pressure element, whereby said first-named pressure element collapses the side-wall of the tire casing and the projecting end of said second-named pressure element moves between the rim of the wheel and the adjacent bead of the tire and both of said pressure elements thereafter rendered capable of conjoint movement to simultaneously continue the collapse of both the aforementioned side-wall and bead.

4. A tire bead loosener for assisting in the removal of a tire casing from a wheel rim comprising a pressure element, a second pressure element carried by said first-named pressure element for bodily shiftable movement with respect thereto, operating means for moving said first-named pressure element into and out of contact with the side wall of an adjacently disposed tire casing and for shifting said second pressure element, said second pressure element being normally held in a retracted position with respect to said first-named pressure element and out of contact with the tire casing, and displaceable means for controlling the shifting of said second pressure element and being adapted to overlie and project from the outer end of said second pressure element and thereby make contact with the rim of the wheel, said displaceable means upon contact with said rim being displaced to allow said operating means to move said second pressure element into projecting position with respect to said first-named pressure element and into contact with the tire casing, whereby said first-named pressure element collapses the side-wall of the tire casing and the projecting end of said second-named pressure element moves between the rim of the wheel and the adjacent bead of the tire and both of said pressure elements thereafter are rendered capable of conjoint movement to simultaneously continue the collapse of both the aforementioned side-wall and bead.

5. A tire bead loosener for assisting in the removal of a tire casing from a wheel rim comprising a pressure element, operating means for moving said pressure element into and out of contact with the side-wall of an adjacently disposed tire casing, a second pressure element carried by said first-named pressure element for bodily shiftable movement with respect thereto, said second pressure element being normally held in a retracted position with respect to said first-named pressure element, and an elongated member pivotally secured to said second pressure element and having a leg pivotally arranged in said operating means, said member being adapted to extend beyond the outer end of said second pressure element and upon contact with said rim to pivot and through said leg cooperate with said operating means for moving said second pressure element into projecting position with respect to said first-named pressure element.

6. A tire bead loosener for assisting in the removal of a tire casing from a wheel rim comprising a pressure element, operating means for moving said pressure element into and out of contact with the side-wall of an adjacently disposed tire casing, a second pressure element carried by said first-named pressure element for bodily shiftable movement with respect thereto, said second pressure element being normally held in a retracted position with respect to said first-named pressure element, and a bell crank lever pivotally secured to said second pressure element and having substantially right angularly disposed legs, one of said legs being arranged as a link in said operating means and the other being adapted to extend beyond the outer end of said second pressure element and thereby make contact with the rim of the wheel, said second-mentioned leg upon contact with said rim causing said bell crank lever to pivot and through said first-mentioned leg cooperate with said operating means for moving said second pressure element into projecting position with respect to said first-named pressure element.

7. A tire bead loosener for assisting in the removal of a tire casing from a wheel rim comprising a pressure element, a second pressure element carried by said first-named pressure element for bodily shiftable movement with respect thereto, operating means for moving said first-named pressure element into and out of contact with the side-wall of an adjacently disposed tire casing and for shifting said second pressure element, a link in said operating means pivotally connected to said second pressure element, said link being disposed for urging said second pressure element into projecting position with respect to said first-named pressure element upon movement of said operating means in the direction of said first-named pressure element, and means for maintaining said second-named pressure element in retracted position during the early movement of said operating means, said last-named means being actuated upon continued movement of said operating means to release said second pressure element and allow said operating means to move said second-named pressure element into projecting position with respect to said first-named pressure element, whereby said first-named pressure element collapses the side-wall of the tire casing and the projecting end of said second-named pressure element moves between the rim of the wheel and the adjacent bead of the tire and both of said pressure elements thereafter are rendered capable of conjoint movement to simultaneously continue the collapse of both the aforementioned side-wall and bead.

8. A tire bead loosener for assisting in the removal of a tire casing from a wheel rim comprising a pressure element, a second pressure element carried by said first-named pressure element for bodily shiftable movement with respect thereto, operating means for moving said first-named pressure element into and out of contact with the side-wall of an adjacently disposed tire casing and for shifting said second pressure element, a link in said operating means pivotally connected to said second pressure element, said link being disposed for urging said second pressure element into projecting position with respect to said first-named pressure element upon movement of said operating means in the direction of said first-named pressure element, a spring for urging said second pressure element into retracted position with respect to said first-named pressure element, the urging action of said spring being insufficient to overcome the shifting action of said operating means upon the above-mentioned movement of said operating means, and means for maintaining said second-named pressure element in retracted position during the early movement of said operating means, said last-named means being actuated upon continued movement of said operating means to release said second pressure element and allow said operating means to move said second-named pressure element into projecting position with respect to said first-named pressure element, whereby said first-named pressure element collapses the side-wall of the tire casing and the projecting end of said second-named pressure element moves between the rim of the wheel and the adjacent bead of the tire and both of said pressure elements thereafter are rendered capable of conjoint movement to simultaneously continue the collapse of both the aforementioned side-wall and bead.

CHARLES R. MIESS.

REFERENCES CITED

The following references are of record in the file of this patent:

UNITED STATES PATENTS

| Number | Name | Date |
|---|---|---|
| 1,564,496 | Staugaard | Dec. 8, 1925 |
| 2,293,467 | Kenworthy | Aug. 18, 1942 |
| 2,314,127 | Colley et al. | Mar. 16, 1943 |
| 2,367,638 | McCulloch | Jan. 16, 1945 |
| 2,449,289 | Garey | Sept. 14, 1948 |
| 2,449,960 | Toles | Sept. 21, 1948 |